US008872123B2

(12) United States Patent
Crouch et al.

(10) Patent No.: US 8,872,123 B2
(45) Date of Patent: Oct. 28, 2014

(54) METHOD OF TIMING LASER BEAM PULSES TO REGULATE EXTREME ULTRAVIOLET LIGHT DOSING

(71) Applicant: Cymer, Inc., San Diego, CA (US)

(72) Inventors: James Crouch, San Diego, CA (US); Robert Jacques, San Diego, CA (US); Matthew R. Graham, San Diego, CA (US); Andrew Liu, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 134 days.

(21) Appl. No.: 13/738,923

(22) Filed: Jan. 10, 2013

(65) Prior Publication Data

US 2014/0191133 A1 Jul. 10, 2014

(51) Int. Cl.
*G01J 1/42* (2006.01)
*G21K 5/00* (2006.01)

(52) U.S. Cl.
CPC .................................... *G21K 5/00* (2013.01)
USPC ............................................ 250/372

(58) Field of Classification Search
CPC ............................................ G21K 5/00
USPC ............................................ 250/372
See application file for complete search history.

(56) References Cited

U.S. PATENT DOCUMENTS 6,700,950 B1 3/2004 Pellegrini et al.
7,057,705 B2 * 6/2006 Heintze ........................ 355/53
7,830,942 B2 * 11/2010 Dunstan et al. ............... 372/55
7,928,416 B2 * 4/2011 Fomenkov ............... 250/504 R
8,030,628 B2 10/2011 Botma
8,304,752 B2 * 11/2012 Fomenkov et al. ....... 250/504 R
8,368,039 B2 * 2/2013 Govindaraju et al. .... 250/504 R
8,704,200 B2 * 4/2014 Bykanov et al. .......... 250/504 R
2007/0008866 A1 * 1/2007 Adams et al. ................. 369/126
2008/0017801 A1 * 1/2008 Fomenkov et al. ........ 250/354.1
2008/0149862 A1 * 6/2008 Hansson et al. .......... 250/504 R
2011/0079736 A1 * 4/2011 Hansson et al. .......... 250/504 R
2011/0220816 A1 9/2011 Kakizaki et al.
2012/0175533 A1 7/2012 Moriya et al.
2012/0193547 A1 * 8/2012 Hansson et al. .............. 250/372
2013/0077073 A1 * 3/2013 Van Schoot et al. ............ 355/67
2014/0091239 A1 * 4/2014 van der Burgt et al. .. 250/504 R

* cited by examiner

*Primary Examiner* — Kiho Kim
(74) *Attorney, Agent, or Firm* — Gard & Kaslow LLP

(57) ABSTRACT

Described herein are embodiments of a method to control energy dose output from a laser-produced plasma extreme ultraviolet light system by adjusting timing of fired laser beam pulses. During stroboscopic firing, pulses are timed to lase droplets until a dose target of EUV has been achieved. Once accumulated EUV reaches the dose target, pulses are timed so as to not lase droplets during the remainder of the packet, and thereby prevent additional EUV light generation during those portions of the packet. In a continuous burst mode, pulses are timed to irradiate droplets until accumulated burst error meets or exceeds a threshold burst error. If accumulated burst error meets or exceeds the threshold burst error, a next pulse is timed to not irradiate a next droplet. Thus, the embodiments described herein manipulate pulse timing to obtain a constant desired dose target that can more precisely match downstream dosing requirements.

14 Claims, 10 Drawing Sheets

METHOD OF TIMING LASER BEAM PULSES TO REGULATE EXTREME ULTRAVIOLET LIGHT DOSING

CROSS-REFERENCE TO RELATED APPLICATIONS

This application is related to U.S. patent application Ser. No. 13/738,918, entitled "A Method of Timing Laser Beam Pukes to Regulate Extreme Ultraviolet Light Dosing," filed on even date herewith.

BACKGROUND OF THE INVENTION

1. Field of the Invention

The present invention relates generally to laser technology for photolithography, and more particularly to EUV dose control during laser firing.

2. Description of the Prior Art

The semiconductor industry continues to develop lithographic technologies which are able to print ever-smaller integrated circuit dimensions. Extreme ultraviolet ("EUV") light (also sometimes referred to as soft x-rays) is generally defined to be electromagnetic radiation having wavelengths of between 10 and 110 nm. EUV lithography is generally considered to include EUV light at wavelengths in the range of 10-14 nm, and is used to produce extremely small features (e.g., sub-32 nm features) in substrates such as silicon wafers. These systems must be highly reliable and provide cost-effective throughput and reasonable process latitude.

Methods to produce EUV light include, but are not necessarily limited to, converting a material into a plasma state that has one or more elements (e.g., xenon, lithium, tin, indium, antimony, tellurium, aluminum, etc.) with one or more emission line(s) in the EUV range. In one such method, often termed laser-produced plasma ("LPP"), the required plasma can be produced by irradiating a target material, such as a droplet, stream or cluster of material having the desired line-emitting element, with a laser beam at an irradiation site.

The line-emitting element may be in pure form or alloy form (e.g., an alloy that is a liquid at desired temperatures), or may be mixed or dispersed with another material such as a liquid. Delivering this target material and the laser beam simultaneously to a desired irradiation site (e.g., a primary focal spot) within an LPP EUV source plasma chamber for plasma initiation presents certain timing and control challenges. Specifically, it is necessary for the laser beam to be focused on a position through which the target material will pass and timed so as to intersect the target material when it passes through that position in order to hit the target properly to obtain a good plasma, and thus, good EUV light.

A droplet generator holds the target material and extrudes the target material as droplets which travel along an x-axis of the primary focal spot to intersect the laser beam traveling along a z-axis of the primary focal spot. Ideally, the droplets are targeted to pass through the primary focal spot. When the laser beam hits the droplets at the primary focal spot, EUV light output is theoretically maximized. In reality, however, achieving maximal EUV output light across bursts over time is very difficult because energy generated by irradiation of one droplet varies randomly from energy generated by irradiation of another droplet.

Thus, maximal EUV light output might sometimes—but not always—be realized. This variability in output is a problem for downstream utilization of the EUV light. For example, if variable EUV light is used downstream in a lithography scanner, wafers can be non-uniformly processed, with resultant diminution of quality control of dies cut from the wafers. Thus, a tradeoff of non-maximal EUV for greater reliability may be desirable.

A stroboscopic pattern produces EUV in short exposures throughout exposure of a wafer die. Although this pattern of bursts can be beneficial for control of the EUV energy dose, what is needed is a method to generate—with greater reliability—acceptable levels of EUV energy output for downstream purposes—that is, to more accurately control an EUV energy dose.

SUMMARY

In one embodiment is provided a method of regulating a dose of energy produced during stroboscopic firing of an EUV light source configured to generate an energy dose target within one or more packet comprising: (a) setting by a laser controller a dose servo value for a current packet; (b) timing by the laser controller a trigger to pulse a laser beam to irradiate a droplet during the current packet; (c) sensing by a sensor EUV energy generated by irradiation of the droplet; (d) accumulating by the laser controller the sensed EUV energy with EUV energy generated by irradiation of one or more preceding droplet during the current packet; (e) repeating steps (b), (c), and (d) when the accumulated EUV energy within the current packet is less than an adjusted dose target based on the energy dose target and an accumulated dose error; and (f) mistiming by the laser controller the trigger to pulse the laser beam to not irradiate another droplet during the current packet.

In another embodiment is the method further comprising: (g) calculating by the laser controller a dose error for the current packet; (h) accumulating by the laser controller the dose error for the current packet with a dose error for one or more preceding packet; (i) calculating by the laser controller a new adjusted dose target for a next packet based on the energy dose target and the accumulated dose error; and (j) calculating by the laser controller a new dose servo value for the next packet.

In still another embodiment a system for regulating a dose of energy produced during stroboscopic burst-firing of an EUV light source configured to generate an energy dose target within one or more packet comprising: a drive laser configured to pulse a laser beam when a trigger is received; a sensor configured to sense EUV energy generated by irradiation of a droplet; and a controller configured to: (a) set a dose servo value for a current packet; (b) time the trigger to pulse the laser beam to irradiate a droplet during the current packet; (c) accumulate sensed EUV energy generated by irradiation of the droplet with EUV energy generated by irradiation of one or more preceding droplet during the current packet; (d) repeat steps (b) and (c) when the accumulated EUV energy within the current packet is less than an adjusted dose target based on the energy dose target and an accumulated dose error; and (e) mistime the trigger to pulse the laser beam to not irradiate another droplet during the current packet.

In yet another embodiment is the system wherein the controller is further configured to: (f) calculate a dose error for the current packet; (g) accumulate the dose error for the current packet with a dose error for one or more preceding packet; (h) calculate a new adjusted dose target for a next packet based on the energy dose target and the accumulated dose error; and (i) calculate a new dose servo value for the next packet.

A method of regulating a dose of energy produced during continuous burst mode of an EUV light source comprising: (a) beginning a burst having a predetermined energy dose target; (b) timing by the laser controller a trigger to pulse a laser beam to irradiate a droplet during the burst; (c) sensing EUV energy generated by the droplet; (d) calculating by the laser controller a current dose error for the droplet based on the sensed EUV energy and the energy dose target; (e) accumulating by the laser controller a burst error based on the current dose error and a running burst error calculated for one or more preceding droplet during the burst; (e) repeating steps (b)-(e) for a next droplet when the burst is not finished and the accumulated burst error does not meet or exceed a threshold burst error; (f) mistiming by the laser controller the trigger to pulse the laser beam to not irradiate the next droplet when the burst is not finished and the accumulated burst error meets or exceeds the threshold burst error; and (g) repeating steps (c)-(g) until the burst is finished.

A system for regulating a dose of energy produced during continuous burst firing of an EUV light source configured to generate an energy dose target comprising: a drive laser configured to pulse a laser beam when a trigger is received; a sensor configured to sense EUV energy generated by irradiation of a droplet; and a controller configure to: (a) time the trigger to pulse a laser beam to irradiate a droplet during the burst; (b) calculate a current dose error for the droplet based on the sensed EUV energy and the energy dose target; (c) accumulate a burst error based on the current dose error and a running burst error calculated for one or more preceding droplet during the burst; (d) repeat steps (a)-(c) for a next droplet when the burst is not finished and the accumulated burst error does not meet or exceed a threshold burst error; (e) mistime the trigger to pulse the laser beam to not irradiate the next droplet when the burst is not finished and the accumulated burst error meets or exceeds the threshold burst error; and (f) repeat steps (b)-(e) until the burst is finished.

DETAILED DESCRIPTION OF THE INVENTION

Figure 1:
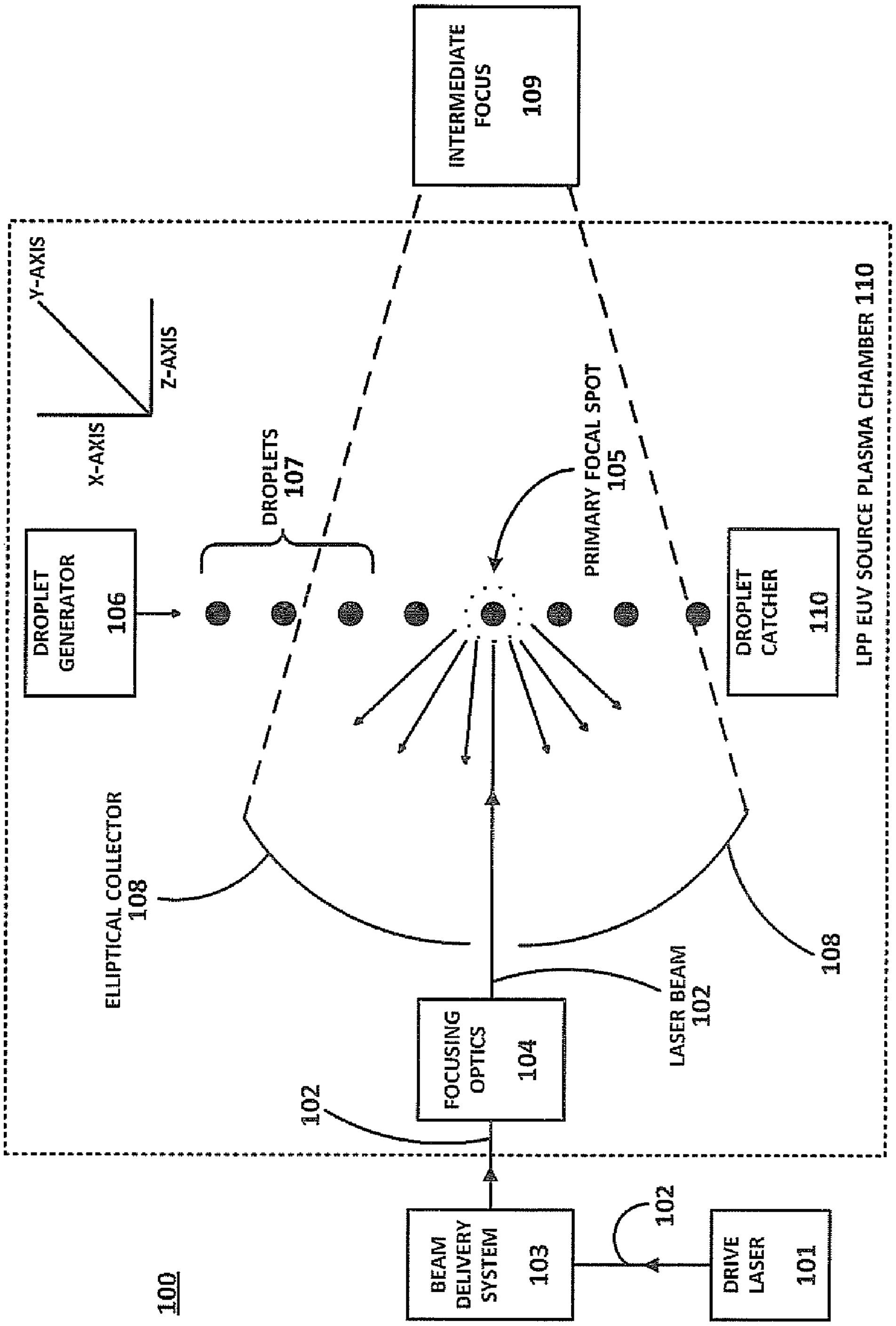
FIG. 1 is a schematic illustrating some of the components of a typical LPP EUV system.

As discussed above, energy (light) output by an EUV system can be used downstream in a number of applications, e.g., semiconductor lithography. In a typical scenario, EUV output might be passed to a lithography scanner in stroboscopic bursts to irradiate photoresist on successive wafers. In laser systems with no master oscillator (i.e., "NOMO" systems), such stroboscopic bursts of energy are achieved by controlling RF pump power to switch a laser between "on" and "off" states. Thus, the amount of energy passed for downstream dosing is controlled by this RF power pumping.

MOPA laser systems (i.e., systems with a master oscillator and power amplifier, including those with a pre-pulse configuration, "MOPA+PP systems") are capable of generating higher power output from a pulsed laser source than are NOMO systems, and are therefore preferable for some downstream applications. Downstream dosing in MOPA systems is not, however, as easily controlled as in NOMO systems because of laser start-up dynamics (e.g., temperature dependent oscillations) of MOPA systems and/or thermal instability of drive laser components (e.g., mirrors and/or lenses) during laser puking. Simply put, it is observed that the MOPA+PP system is unable to produce adequate stable levels of EUV for a period of time immediately after switching on an RF signal to power amplifiers. Thus, cycling the MOPA+PP laser system between "on" and "off" states is not a particularly practical or efficient way to control EUV dosing for downstream applications.

As described herein with respect to various embodiments, the problematic laser start-up can be avoided by instead continuously pulsing the laser—that is, by keeping the laser system "on" (i.e., maintaining the RF signal gate in a continuous "on" state). Rather than switching the laser between "on" and "off" states, energy output levels can be controlled via a procedure to adjust timing of laser beam pulses so that some—but not all—pulses irradiate droplets at the primary focal spot. By regulating how many droplets are irradiated by laser beam pulses, the output energy dose can be maintained at a desired (and stable) dose target level.

More specifically, the drive laser (e.g., MOPA) is switched "on" to fire long bursts (e.g., 2 sec.) of pulses, then switched "off" for a short period, then switched "on" to fire long bursts of pulses, etc. Within the long bursts, the drive laser can be timed to fire stroboscopically—that is, to continuously fire short mini-bursts (or "packets"), each having a pre-determined number of rapid pulses. During each packet, pulses are timed to lase droplets in the primary focal spot and thereby generate EUV energy—until a dose target of EUV has been achieved. Once the generated EUV energy within the packet reaches the dose target, pulses are timed to fire so as to not lase the droplets during the remainder of the packet, and thereby prevent additional EUV light generation during those portions of the packet. On a packet-to-packet basis i.e., between packets), calculated dosing error (that is, how much the achieved dose differs from the dose target) from previous packets is used to fine-tune the dose target for the next packet.

Alternatively, the drive laser (e.g., MOPA) can be timed to fire continuously throughout the long bursts of pulses (i.e., fire in a continuous burst mode). During each burst, pulses are timed to lase droplets in the primary focal spot and thereby generate EUV energy—as long as dose error (i.e., deviation of obtained EUV energy from the desired energy dose target) accumulated within the burst does not meet or exceed an acceptable level of error. Once the accumulated dose error for the burst ("accumulated burst error) meets or exceeds the level of acceptable error, a next pulse is timed to fire so as to not lase a droplet, and thereby drive the accumulated burst error back to an acceptable level. When the dose error for the burst is at an acceptable level, a next pulse is again timed to lase a droplet in the primary focal spot and thereby generate EUV energy.

Thus, the method described herein modulates pulse timing so that a desired dose target is obtained. For example, if pulses are fired at a rate of 50,000 pulses/sec, and all pulses are fired on-droplet, then an average packet output of 35 watts would be achieved. If, however, the dose target is only 30 watts, the method described herein provides a way to limit the achieved dose to that 30 watts—even at a pulse rate of 60,000 pulses/sec.

FIG. 1 illustrates some of the components of a typical LPP EUV system 100. A drive laser 101, such as a $CO_2$ laser, produces a laser beam 102 that passes through a beam delivery system 103 and through focusing optics 104. Focusing optics 104 have a primary focal spot 105 at an irradiation site within an LPP EUV source plasma chamber 110. A droplet generator 106 produces and ejects droplets 107 of an appropriate target material that, when hit by laser beam 102 at the irradiation site, produce plasma that emits EUV light. The EUV light is collected by an elliptical collector 108 which focuses the EUV light from the plasma at an intermediate focus 109 for delivering the produced EUV light to, e.g., a lithography system. Intermediate focus 109 will typically be within a scanner (not shown) containing boats of wafers that are to be exposed to the EUV light, with a portion of the boat containing wafers currently being irradiated by light through intermediate focus 109. In some embodiments, there may be multiple drive lasers 101, with beams that all converge on focusing optics 104. One type of LPP EUV light source may use a $CO_2$ laser and a zinc selenide (ZnSe) lens with an anti-reflective coating and a clear aperture of about 6 to 8 inches.

Energy output from the LPP EUV system varies based on how well laser beam 102 can be focused and can maintain focus over time on droplets 107 generated by droplet generator 106. Optimal energy is output from EUV system 100 if the droplets are positioned in primary focal spot 105 when hit by laser beam 102. Such positioning of the droplets allows elliptical collector 108 to collect a maximum amount of EUV light from the generated plasma for delivery to, e.g., a lithography system. A sensor (not shown, e.g., narrow field (NF) camera) senses the droplets as they pass from droplet generator 106 through a laser curtain during travel to primary focal spot 105 and provides droplet-to-droplet feedback to EUV system 100, which droplet-to-droplet feedback is used to adjust droplet generator 106 to re-align droplets 107 to primary focal spot 105 (i.e., "on-target").

When firing drive laser 101 in stroboscopic or continuous burst modes, EUV system 100 maintains droplets 107 on-target reasonably well using closed-loop (droplet to-droplet) feedback according to techniques known in the art. Regardless of how well droplets are maintained on-target, however, total energy produced during a packet can vary due to random fluctuations in the amount of energy generated by each irradiated droplet. These random fluctuations make maintenance of a constant dose target output difficult. Maintaining a constant level of output energy is, however, important for downstream purposes. If a constant level of output energy cannot be maintained, then downstream use of the output energy within, e.g., a lithography scanner negatively affects silicon wafer patterning.

Figure 2:
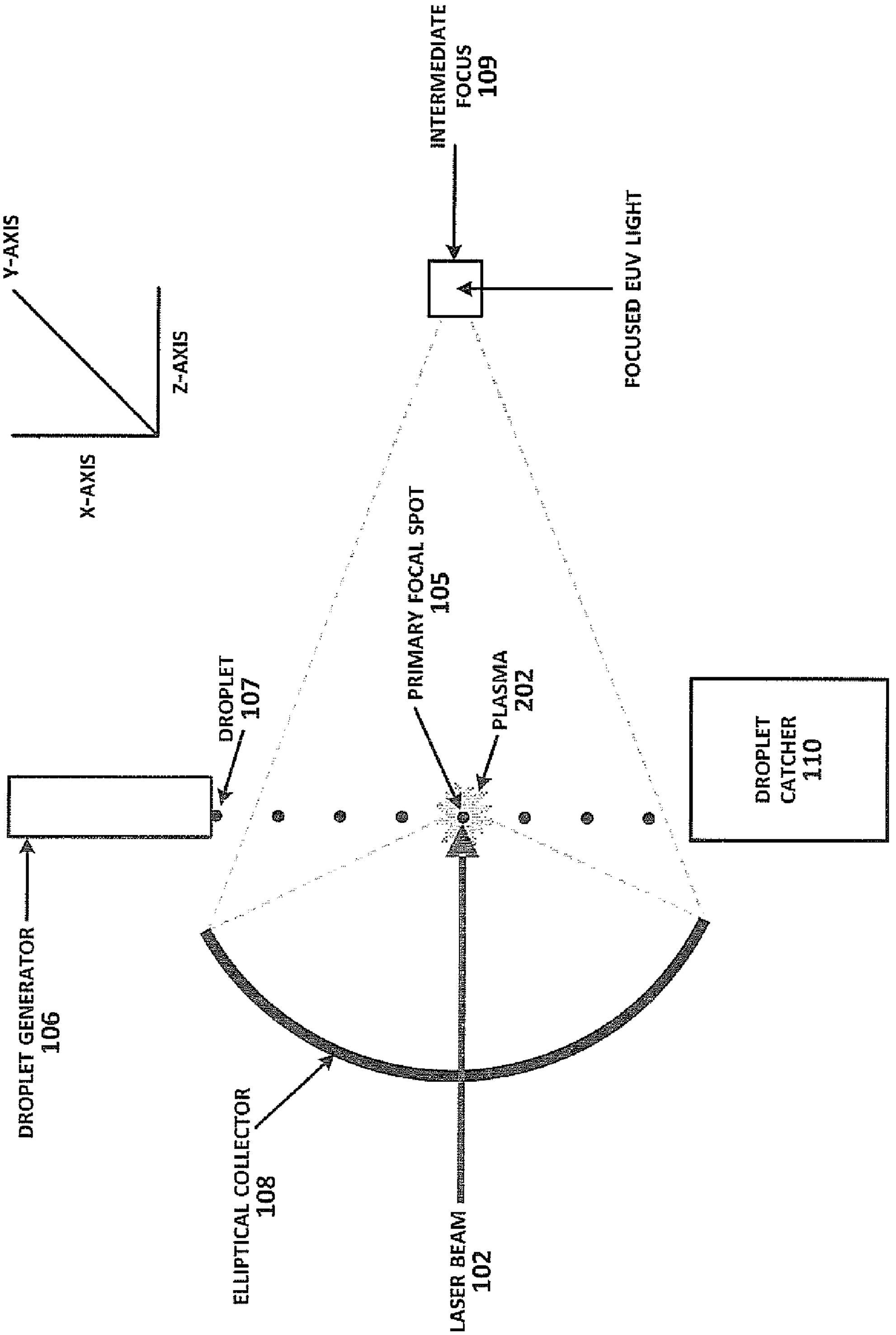
FIG. 2 is a schematic illustrating laser puking to irradiate a droplet.
Figure 3:
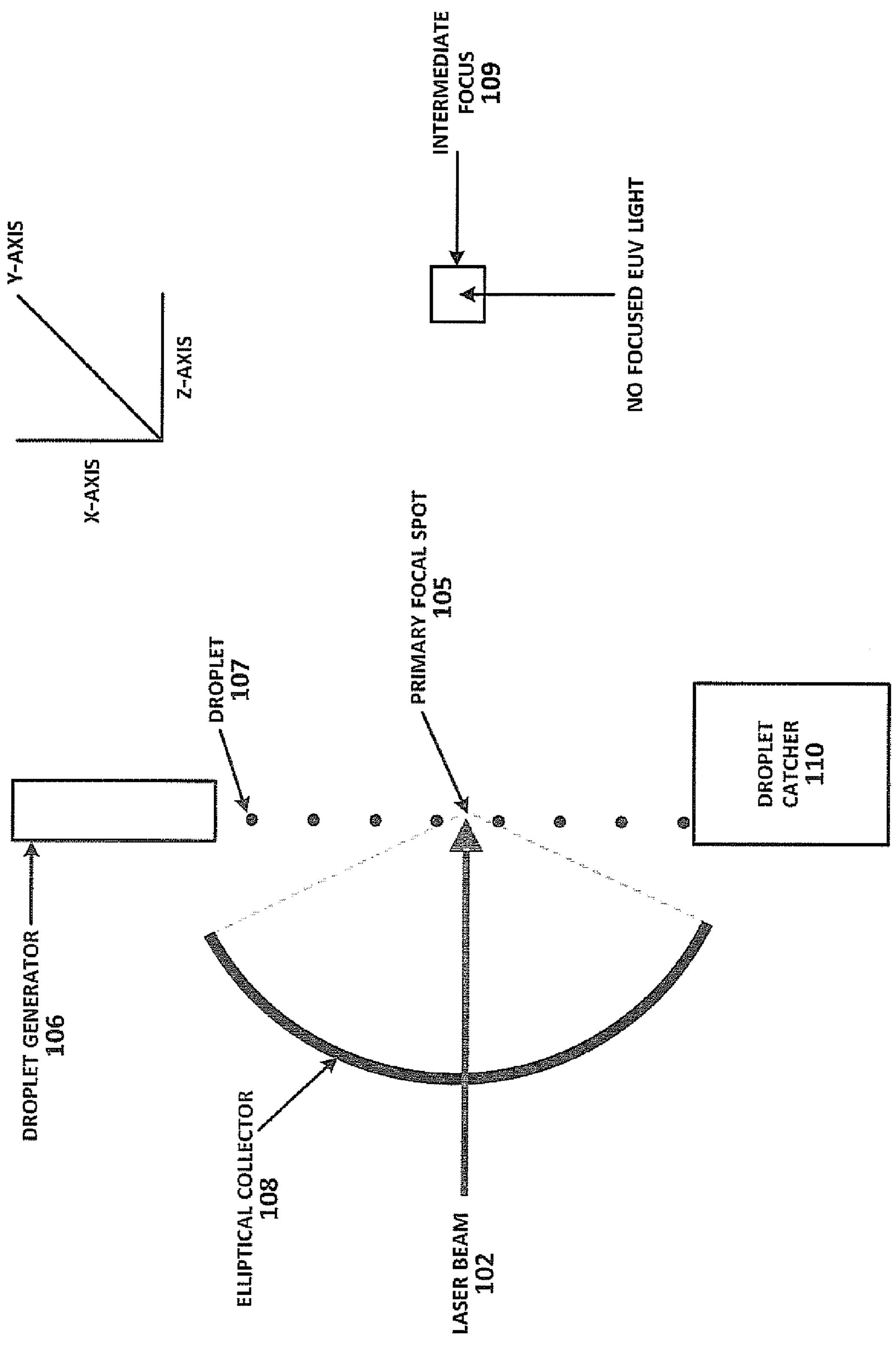
FIG. 3 is a schematic illustrating mistimed laser pulsing to avoid irradiating a droplet.
Figure 4:
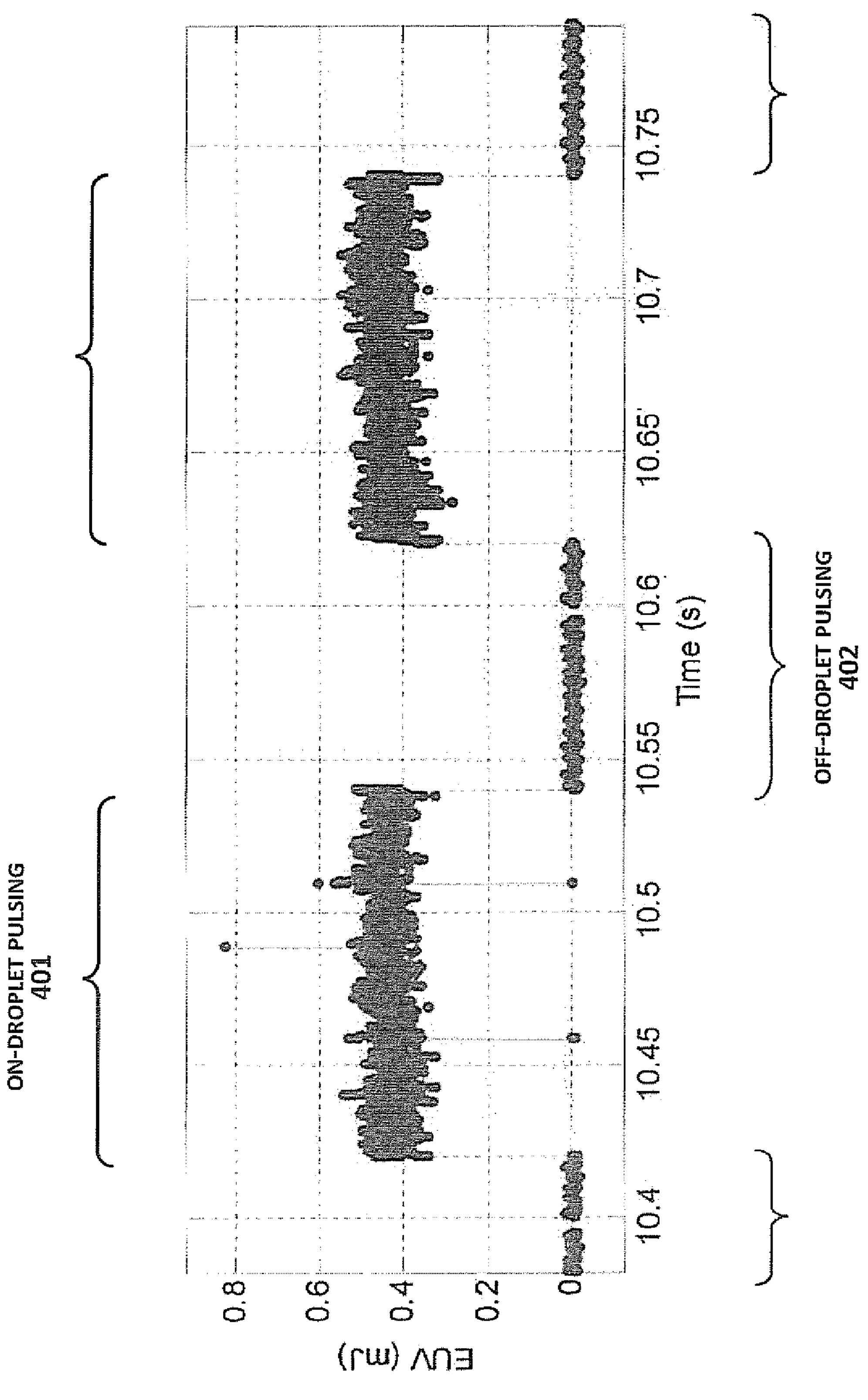
FIG. 4 is a graph of energy generated over time during periods of laser pulsing to irradiate droplets and during periods of mistimed laser pulsing to avoid irradiating droplets according to one embodiment.

Energy generated during burst firing can be maintained at a reliably constant level by adjusting the timing between the arrival of a droplet at the primary focal spot and the arrival of the laser beam at the primary focal spot as will now be described with reference to FIGS. 2, 3, and 4. FIGS. 2 and 3 illustrate schematically the orientation of droplets 107 during burst firing when the laser is timed to pulse, respectively, to irradiate a droplet (i.e., to pulse "on-droplet") and to avoid irradiating a droplet (to pulse "off-droplet"). FIG. 4 is a graph depicting energy generated over time during periods of laser pulsing to irradiate droplets and during periods of mistimed laser pulsing to avoid irradiating droplets.

Referring first to FIG. 2, when the laser is timed to pulse on-droplet ("on-droplet pulsing"), the pulse of laser beam 102 hits a droplet 107 at primary focal spot 105, the target material of droplet 107 is vaporized, and a plasma 202 is generated at primary focal spot 105. EUV energy emitted from plasma 202 is collected by elliptical collector 108 and reflected onto intermediate focus 109 where it passes into or is used by, e.g., a lithography system. As shown in FIG. 4, the generated EUV energy during on-droplet pulsing 401 clusters, on average, around a mean energy value (here, approximately 0.45 mJ), but is highly variable due to random fluctuations of energy generated for each droplet. This variability can drive the obtained energy dose from any given packet away from a desired constant EUV dose target and thereby negatively impact downstream operations.

Referring now to FIG. 3, when the laser pulsing is mistimed to pulse off-droplet ("off-droplet pulsing"), the pulse of laser beam 102 passes through primary focal spot 105 between droplets so that the target material of the droplet is not vaporized, and no plasma is generated at primary focal spot 105. In the MOPA+PP system, timing of a trigger to pulse can be either advanced or delayed such that laser beam 102 passes through primary focal spot 105 without hitting droplet 107. As shown in FIG. 4, little or no EUV energy is therefore produced when pulsing off-droplet 402.

Embodiments of the method described herein for stroboscopic firing determine, on a pulse-to-pulse basis within a packet, whether the desired energy dose target of a current packet has been achieved. Thus, after a droplet within a packet is lased, the total energy dose for the packet is calculated and compared to the desired energy dose target. If the desired energy dose target has not been achieved, the trigger to the drive laser for the next pulse is timed so that a next droplet is lased on-droplet. If the desired energy dose target has been achieved, the trigger to the drive laser for the next pulse is mistimed so that the next droplet is lased off-droplet so that no additional energy is generated within the current packet. Between packets (i.e., on a packet-to-packet basis, calculated dose error from the current packet is accumulated with dose error from previous packets and used as a "servo" to fine-tune the dose target for a next packet.

Figure 5:
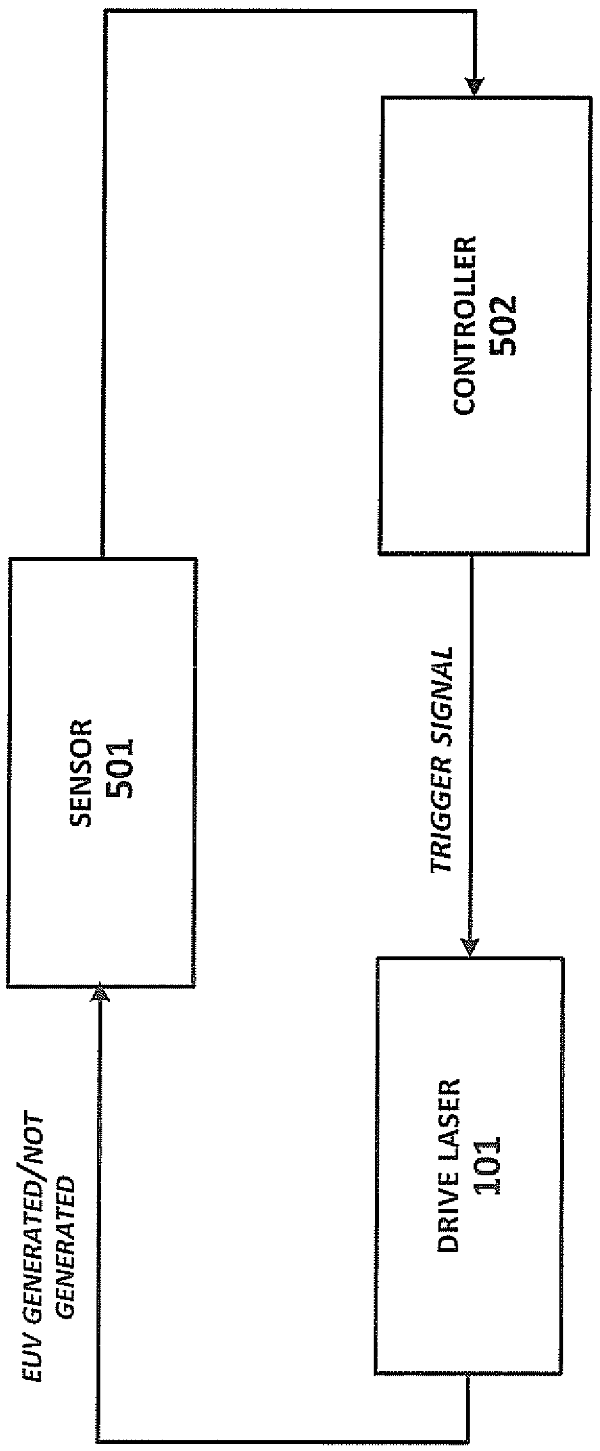
FIG. 5 is a block diagram depicting EUV system components involved in dose control of EUV light according to one embodiment.

The block diagram of FIG. 5 shows EUV system components involved in dose control of generated EUV light according to one embodiment. A laser controller 502 times a trigger to drive laser 101 to pulse on-droplet such that the droplets, when irradiated, generate plasma that emits EUV energy. The amount of collected EUV energy is sensed on a pulse-to-pulse basis by an energy output sensor 501 and passed to laser controller 502 which accumulates a running total of the total EUV energy generated during a current packet. Sensor 501 is either a sensor within LPP EUV source plasma chamber 110, e.g., an EUV side sensor positioned at 90° with respect to the laser beam 102 or a sensor within the scanner measuring energy passed through intermediate focus 109. When the accumulated EUV equals or minimally exceeds the dose target, laser controller 502 mistimes the trigger to drive laser 101 such that drive laser 101 pulses off-droplet to avoid generating additional EUV energy. Drive laser 101 continues to pulse off-droplet for the remainder of the current packet. When the current packet is complete, laser controller 502 calculates dose error for the current packet, and accumulates that dose error with dose error from preceding packets. Controller, 502 then adjusts, based on that accumulated dose error, the dose target against which the accumulated achieved EUV energy is compared during a next packet.

Embodiments of the method of laser beam pulse timing disclosed herein for stroboscopic pulsing regulate average EUV by firing some portion of pulses within a packet off-droplet. For example, when pulse energy increases, the number of pulses fired on droplet (the pulse count) is decreased in order to maintain the same average EUV. Over time, random fluctuations of generated EUV energy can be better understood so that packet size can be adjusted to minimize lasing time off-droplet.

Figure 6:
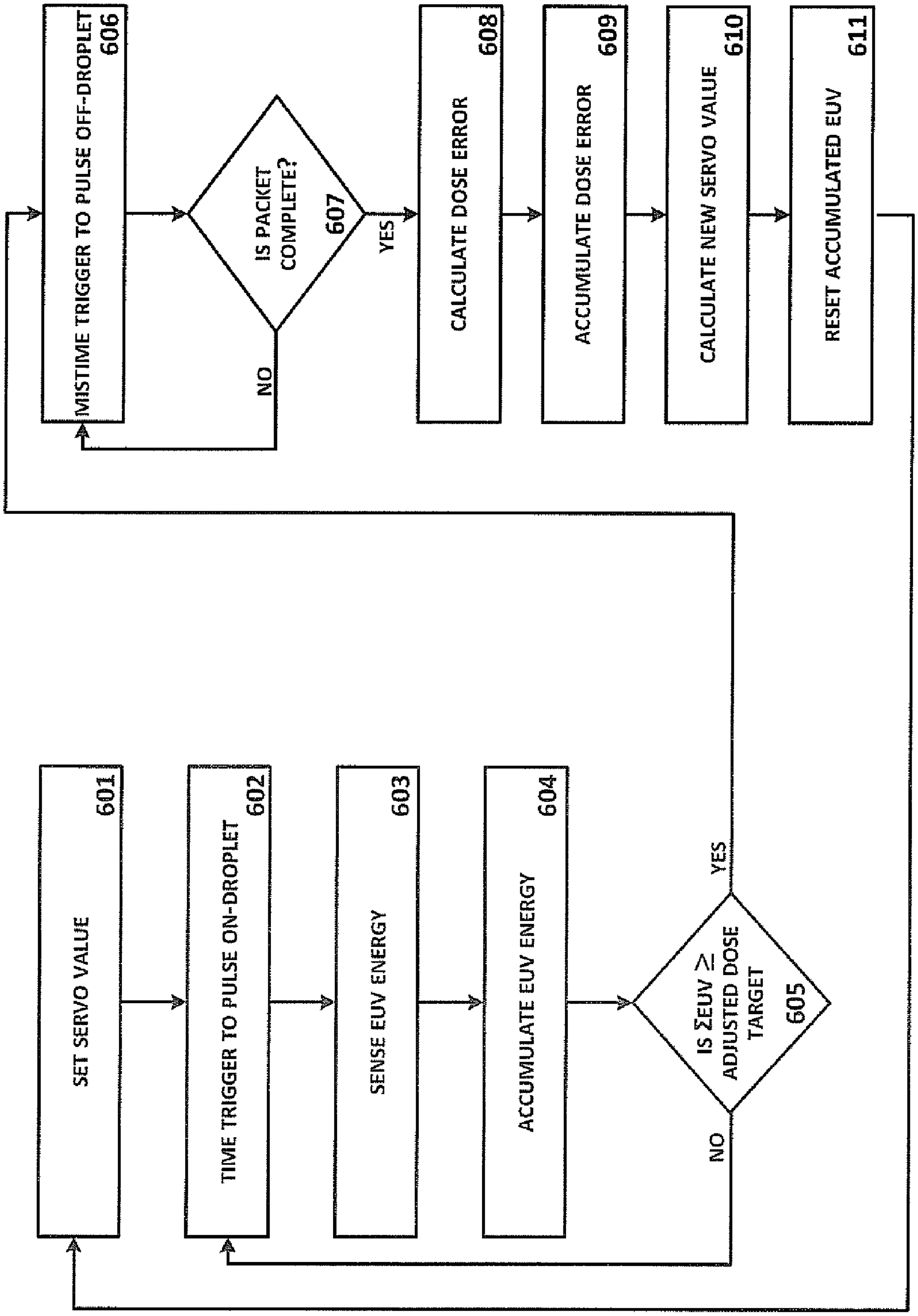
FIG. 6 is a flowchart of a method to control stroboscopic EUV dose by laser beam pulse timing according to one embodiment.

Referring now to FIG. 6, a flowchart of a method of timing laser beam pulses to control stroboscopic EUV dose according to one embodiment is presented. Before initiating the following steps, a dose target of EUV energy to be achieved within each packet of a burst (i.e., a setpoint to which the packet energy is to be regulated) and a packet size (i.e., a total number of pulses within each packet) are input by a user or determined by the system.

The packet size is preferably selected so as to be the smallest packet size which allows the EUV energy dose to be controlled. If the packet size is too small (e.g., 1 or 2 droplets), it may not be possible to mistime pulsing for enough droplets to adequately control the EUV energy dose. If the packet size is too large (e.g., 1000 droplets), uncontrollable error accumulates throughout the packet (e.g., as shown in FIG. 4), with consequent poor control over the amount of EUV generated for downstream dosing. Thus, the packet size is ideally selected so that pulse timing can be modulated, but only for the droplets at the back end of a packet. For example, a packet size of 50 drops may be appropriate if an adequate dose can be achieved on average with 40 droplets (which would allow pulse mistiming to occur over the last 10 droplets).

In step 601, laser controller 502 sets a dose servo value for a current packet. The dose servo value is an adjustment factor by which a dose target is increased or decreased as a function of the dose energies produced by previous packets. That is, the desired dose target is fine-tuned by the dose servo value which is determined (as discussed elsewhere herein) by error from previous packets. In one embodiment, the dose servo value is set to 0 for a first packet.

Once the servo value has been set, firing of laser pulses for a packet can begin. Steps 602-607 are performed on a pulse-to-pulse basis—that is, for each pulse of the packet.

In step 602, laser controller 502 times a trigger to pulse drive laser 101 on-droplet so that laser beam 102 irradiates droplet 107 in primary focal spot 105.

In step 603, sensor 501 senses how much EUV energy has been generated by the irradiation of droplet 107 in step 602.

In step 604, laser controller 502 accumulates EUV energy by adding the sensed EUV energy of step 603 to a running total of EUV generated since the first pulse of the packet (that is, since step 601).

In step 605, laser controller 502 determines whether the accumulated EUV energy of step 604 is equal to or minimally greater than an adjusted dose target. The adjusted dose target is the sum of the dose target and the dose servo value of step 601. The accumulated EUV energy may be minimally greater than an adjusted dose target for various reasons, e.g., because of random fluctuations in EUV generated by each irradiated droplet and/or because energy generated by each irradiated droplet (even without random fluctuation) is not a constant even value. If the accumulated EUV energy is not greater than or equal to the adjusted dose target of step 601, laser controller 502 returns to step 602 to trigger another on-droplet pulse and repeat steps 603, 604, and 605.

If the accumulated EUV energy is greater than or equal to the adjusted dose target, then in step 606, laser controller 502 mistimes the trigger to pulse drive laser 101 off-droplet such that laser beam 102 does not irradiate droplet 107 in primary focal spot 105. The mistimed trigger can be delayed or advanced in time relative to timing of a next trigger for on-droplet pulsing—that is, relative to timing of a next trigger for on-droplet pulsing if the accumulated EUV energy of step 604 were not greater than or equal to the adjusted dose target.

In step 607, laser controller 502 determines whether the packet is complete—that is, whether the number of pulses fired by drive laser 101 is equal to the packet size. If laser controller 502 determines that the packet is not complete, laser controller 502 returns to step 606 to trigger another pulse off-droplet.

If laser controller 502 determines that the packet is complete, then steps 608-611 and another step 601 are performed before a next packet begins.

In step 608, laser controller 502 calculates a dose error for the packet. Dose error is defined as the dose target minus the EUV energy accumulated over the packet. Mathematically, $$\text{dose error}_{packet}=\text{dose target}-\Sigma EUV_{packet}.$$

In step 609, laser controller 502 accumulates dose error from the packet with dose error from previous packets.

In step 610, laser controller 502 uses the accumulated dose error calculated in step 609 to calculate a new dose servo value. In one embodiment, the new dose servo value is calculated as $$\text{previous servo value}+(\text{gain}*\text{accumulated dose error})$$

where the previous dose servo value is the dose servo value set in step 601. The gain is preferably 1.0. The gain can range between 0.01 and 100.

In step 611, laser controller 502 resets the accumulated EUV to zero in preparation for a next packet and returns to step 601 where the new dose servo value is set as the dose servo value for the next packet.

Importantly, packets repeat at a regular frequency. That is, regardless of how many pulses within a packet hit droplets at primary focal spot 105, a packet begins at a set time after firing the number of pulses in a packet. Because the number of pulses which hit droplets within a packet changes based on how much energy has been generated by irradiation of previous droplets, however, the last pulse to hit a droplet within a packet may vary across different packets.

Further, because packets have a set number of pulses, although not shown in the figure, it is to be understood that if the set number of pulses has been reached during looping of steps 602-605, the packet may conclude without needing to mistime the trigger to pulse the laser off-droplet (e.g., if the accumulated EUV energy for the packet has not met or exceeded the adjusted dose target for the packet). Specifically, if laser controller 502 determines, after accumulating EUV energy for the packet in step 604, that the packet is complete (i.e., if the number of pulses fired by drive laser 101 is equal to the packet size), then laser controller 502 does not return to step 602 to time another trigger to pulse drive laser 101 on-droplet, and instead performs steps 608-611 before a next packet begins. Thus, laser controller 502 calculates the dose error for the packet (step 608), accumulates the dose error from the packet with dose error from previous packets (step 609), uses the accumulated dose error calculated in step

609 to calculate a new dose servo value (step 610), and resets the accumulated EUV to zero in preparation for a next packet before returning to step 601 where the new dose servo value is set as the dose servo value for the next packet (step 611).

Figure 7:
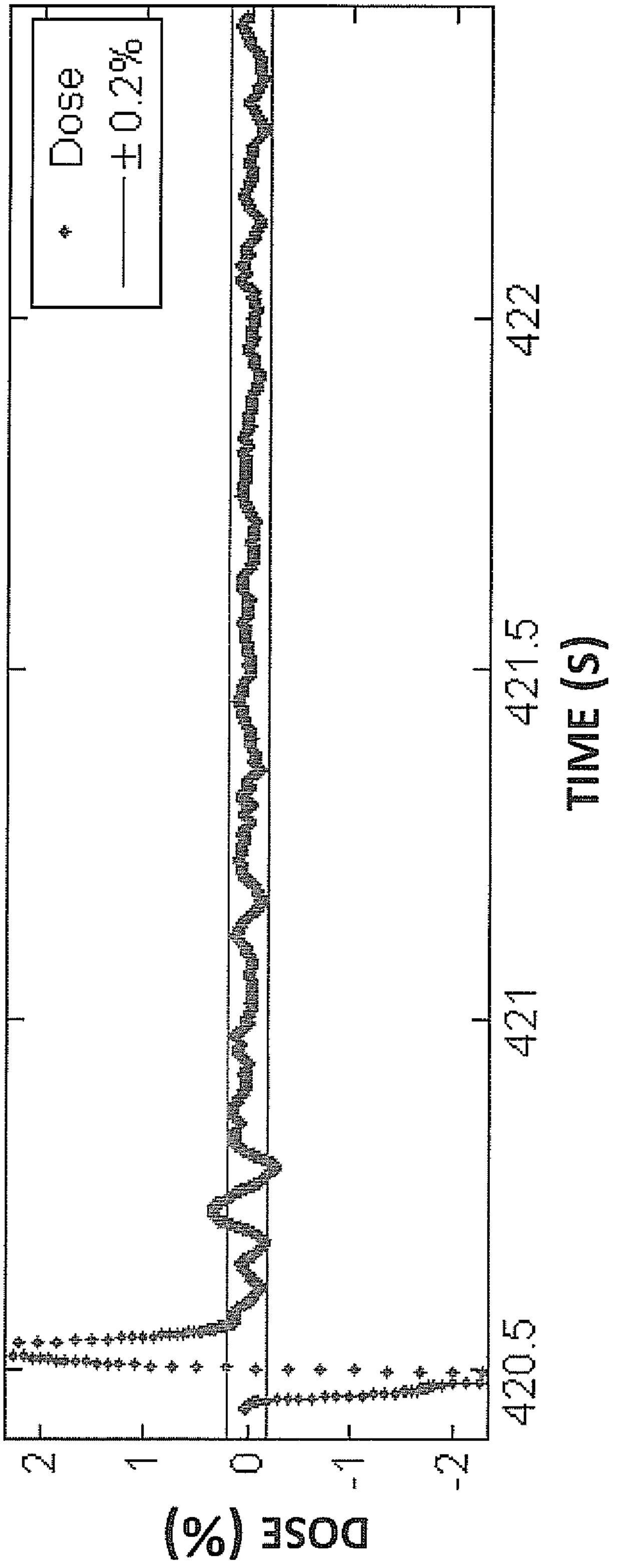
FIG. 7 is a data plot showing percent variation around an energy dose target achieved over a 2-second burst using laser beam pulse timing to control EUV dose according to one embodiment.
Figure 8:
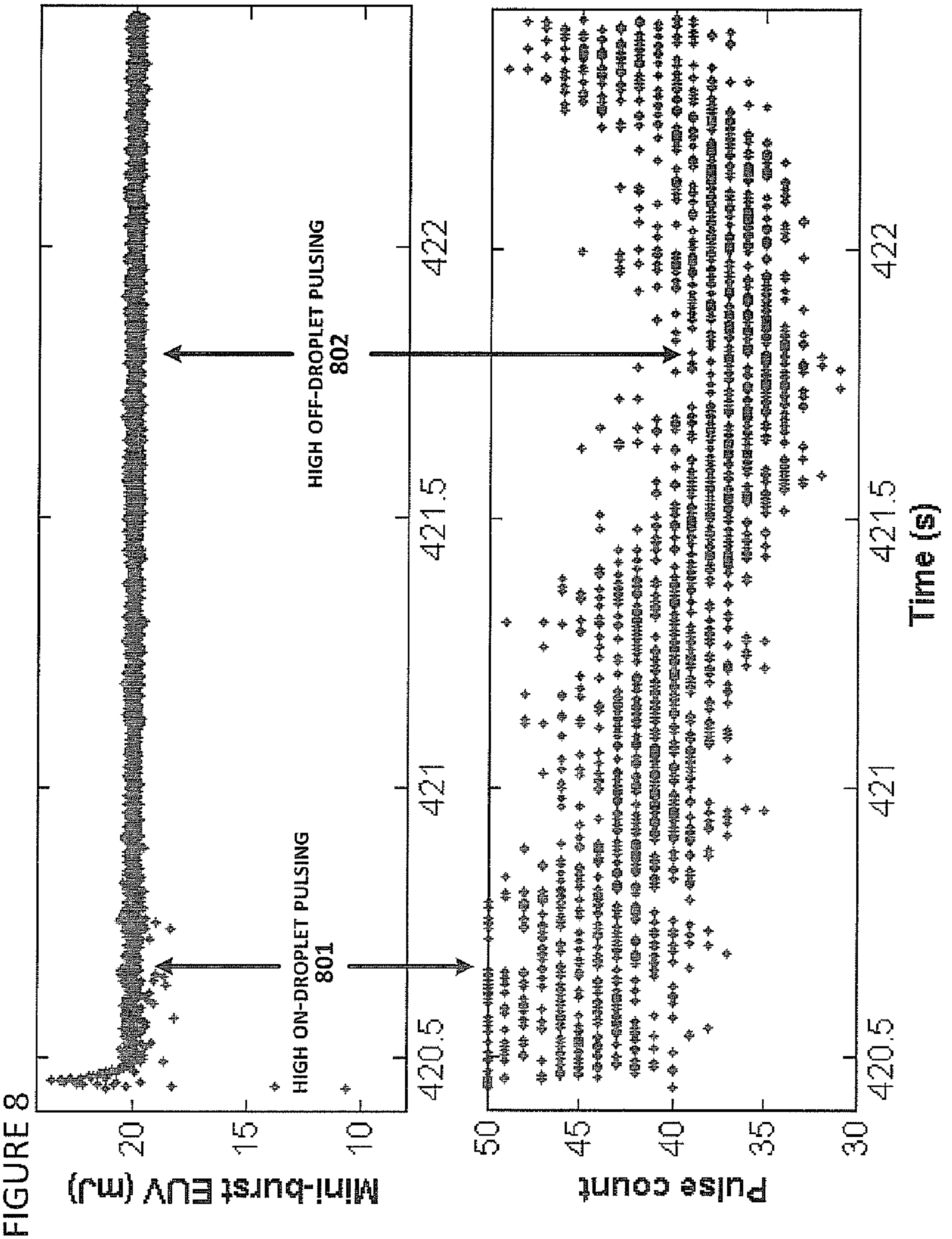
FIG. 8 shows packet EUV energy (upper panel) and pulse count (lower panel) generated over the 2-second burst using laser beam pulse timing to control EUV dose according to one embodiment.

FIGS. 7 and 8 are time-aligned plots showing data generated over a 2-second burst using one embodiment of the laser beam pulse timing method to control EUV dose. FIG. 7 shows percent variation around an energy dose target achieved over the 2-second burst. As indicated by the plotted percent dose energy variation around a dose target seen in the figure, packet dosing controlled by pulse timing is achieved well within ±0.5% of dose target (i.e., within ±0.5% of 0 in the figure).

The upper panel of FIG. 8 shows packet EUV generated over the 2-second burst. As seen in the figure, energy is maintained at the dose target (here, approximately 20 mJ) over time—and is stably maintained within ±0.5% of dose target. The lower panel of FIG. 8 shows a corresponding pulse count over the 2-second burst. Each diamond represents a count of the number of pulses on-droplet ("pulse count") within a single packet. Exemplary packet EUV energy (upper panel) and packet pulse count (lower panel) with greater on-droplet pulsing 801 and with greater off-droplet pulsing 802 (and, therefore, a lower pulse count) are indicated by arrows. As indicated by the arrows, depending on random fluctuations of generated EUV energy, fewer pulses may be needed to achieve a constant EUV energy.

As applied to continuous burst firing, embodiments of the method described herein determine, on a pulse-to-pulse basis within each burst, a dose error for each droplet (i.e., how much obtained EUV energy deviates from the desired energy dose target). Dose error is accumulated as the burst progresses. Thus, after a droplet within a burst is lased, dose error for that droplet is calculated and accumulated with dose error for preceding droplets within the burst. If the accumulated dose error for the burst (i.e., "accumulated burst error") meets or exceeds an acceptable level of burst error (i.e., "threshold burst error"), the trigger to the drive laser for a next pulse is mistimed so that the next droplet is lased off-droplet and no additional energy is generated. Since no additional energy is generated, the dose error for that next droplet is of sufficient magnitude to drive the accumulated burst error back to an acceptable level (i.e., below a threshold burst error). When the accumulated burst error is less than the threshold burst error, the trigger to the drive laser for a next pulse is timed so that the next droplet is lased on-droplet to generate additional EUV energy.

Figure 9:
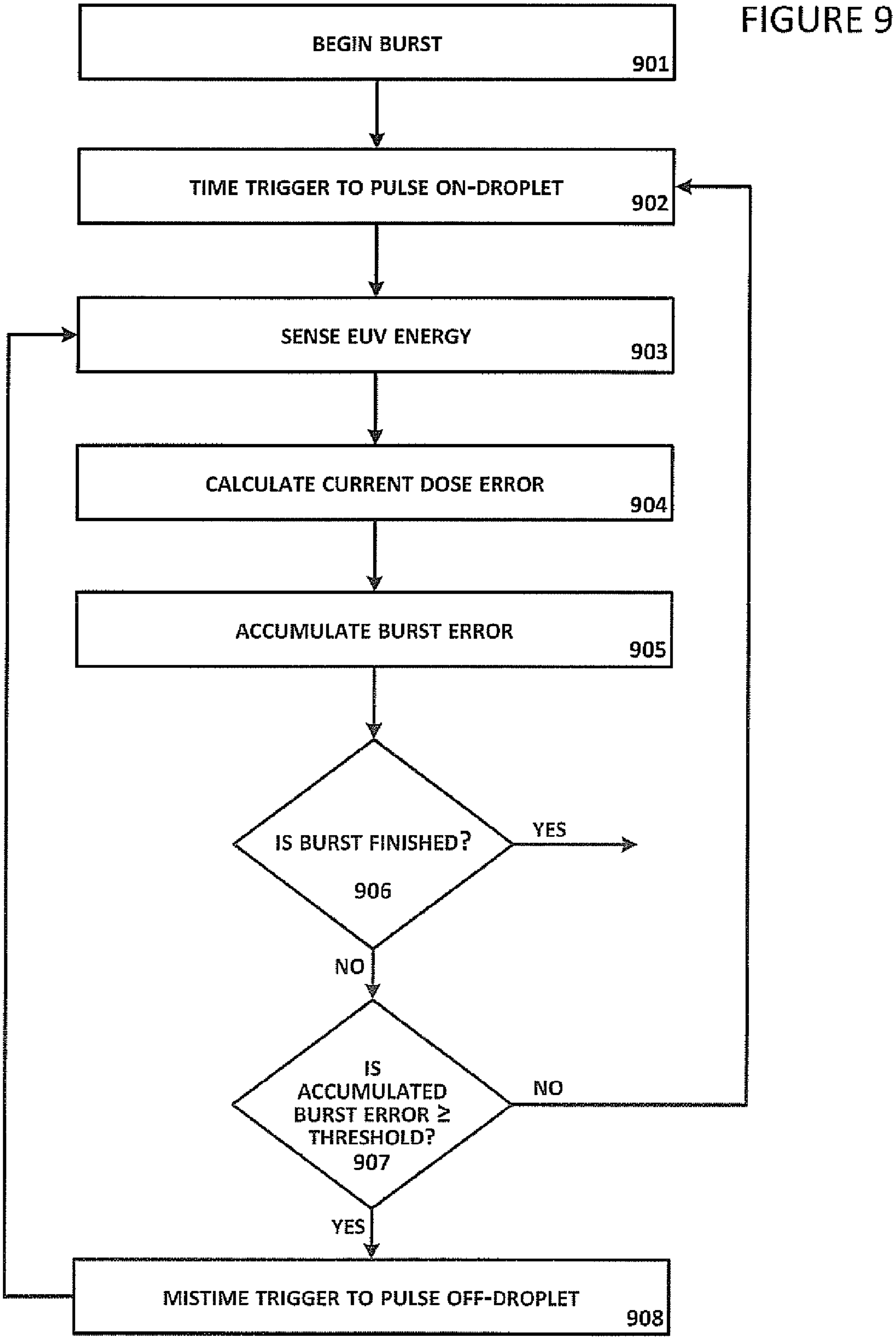
FIG. 9 is a flowchart of a method of timing laser beam pulses to control EUV dose during continuous burst firing according to one embodiment.

Referring now to FIG. 9, a flowchart of a method of timing laser beam pulses to control EUV dose during continuous burst firing according to one embodiment is presented. Before initiating the following steps, a dose target of EUV energy to be achieved within each burst (i.e., a setpoint to which the burst energy is to be regulated) and a threshold burst error (i.e., an acceptable level of burst error) are input by a user or determined by the system.

Once the dose target has been set, then, in step 901, firing of laser pulses for a burst can begin. The process of steps 902-908 are performed on a pulse-to-pulse basis—that is, for each pulse of the burst.

In step 902, laser controller 502 times a trigger to pulse drive laser 101 on-droplet so that laser beam 102 irradiates a current droplet 107 in primary focal spot 105.

In step 903, sensor 501 senses how much EUV energy has been generated by the irradiation of current droplet 107 in step 902.

In step 904, laser controller 502 calculates a current dose error for current droplet 107. Current dose error is defined as the EUV energy generated by irradiation of current droplet 107 (and sensed in step 903) minus the dose target. Mathematically, $$\text{current dose error}=\text{EUV}_{current\ droplet}-\text{dose target}$$

In step 905, laser controller 502 accumulates a burst error by adding the current dose error calculated in step 904 to a running total of dose error accumulated since the first pulse of the burst that is, since step 901). The current dose error is adjusted by a gain which can range between 0.01 and 100, but is preferably 1. In one embodiment, the accumulated burst error is calculated as $$\text{running burst error}+(\text{gain}*\text{current dose error})$$

where the running burst error is a running total of dose error accumulated from preceding droplets within the burst. That is, the running burst error is the accumulated burst error determined for a preceding droplet 107 in step 905. The running burst error is set to 0 when the current droplet is the first droplet in a burst.

In step 906, laser controller 502 determines whether the burst is finished. If laser controller 502 determines that the burst is finished, laser controller 502 exits the pulse timing method and/or returns to step 901 to begin another burst.

If, in step 906, laser controller 502 determines that the burst is not finished, then, in step 907, laser controller 502 determines whether the accumulated burst error of step 905 meets or exceeds a burst error threshold. The burst error threshold is input by a user or determined by the system. The burst error threshold is preferably zero, but may be greater or less than zero.

If laser controller 502 determines in step 907 that the accumulated burst error does not meet or exceed the burst error threshold, then laser controller 502 returns to step 902 to time a trigger to pulse drive laser 101 on-droplet so that laser beam 102 irradiates a next droplet 107 in primary focal spot 105.

If laser controller 502 determines in step 907 that the accumulated burst error meets or exceeds the burst error threshold, then, in step 908, laser controller 502 mistimes the trigger to pulse drive laser 101 off-droplet such that laser beam 102 does not irradiate a next droplet 107 in primary focal spot 105. The mistimed trigger can be fired so the laser pulse arrives at the primary focal spot early or late relative to the arrival of the droplet.

After mistiming the trigger to pulse drive laser 101 off-droplet for next droplet 107, laser controller 502 returns to step 903 to sense how much EUV energy has been generated by irradiation of current droplet 107, and then, in step 904, to calculate a current dose error for next droplet 107. Because no EUV is generated for next droplet 107 due to the mistiming of the pulse, the calculated current dose error for next droplet 107 is equal in magnitude but opposite in sign to the dose target. For example, if the dose target is 1.75 mJ, the calculated current dose error would be −1.75 mJ—or 100%—which is very high relative to error around the dose target for an irradiated droplet (which is typically much less than 40%). Thus, when laser controller 502, in step 905, accumulates burst error by adding the relatively large current dose error for next droplet 107 to the running burst error, the accumulated burst error is typically reduced relative to the accumulated burst error for previous droplet 107. Assuming logic controller 502 decides, in step 906, that the burst is not finished, logic controller 502 determines, in step 907, whether the accumulated burst error meets or exceeds the burst error threshold. If laser controller 502 determines that the accumulated burst error does not now meet or exceed the burst error threshold, then laser controller 502 returns to step 902 to time the trigger to pulse drive laser 101 on-droplet so that laser beam 102 irradiates another droplet 107 (which now becomes current droplet 107) in primary focal spot 105, and the process of FIG. 9 iterates from that step. If laser controller 502 determines that the accumulated burst error again meets or exceeds the burst error threshold, then, in step 908, laser controller 502 mistimes the trigger to pulse drive laser 101 off-droplet such that laser beam 102 does not irradiate a next droplet 107 in primary focal spot 105, and then returns again to step 903 to sense how much EUV energy has been generated. The process of FIG. 9 then iterates from that point.

In another embodiment, the current dose error of step 904 is defined instead as the dose target minus the EUV energy generated by irradiation of current droplet 107 (and sensed in step 903). Mathematically, $$\text{current dose error}=\text{dose target}-EUV_{current\ droplet}$$

In this embodiment, a negative gain (rather than the positive gain of the above embodiment) is used to adjust the current dose error during computation of the accumulated burst error in step 905. The gain can range between −0.01 and −100, but is preferably −1.

One of skill in the art will recognize that other embodiments that may be less intuitively satisfying are possible (but non-preferred) as long as aspects of the method are internally consistent to meet the objective of comparing, on a pulse-to-pulse basis, accumulating burst error throughout the burst to a threshold of acceptable burst error to determine whether to control energy generation by mistiming a next pulse. Specifically, the mathematics of the calculation of the current dose error (step 904) and the gain applied to the current dose error when calculating the accumulated burst error (step 905) should remain consistent with each other and with the decision rule outcomes following from the comparison of the accumulated burst error to the threshold burst error (step 907).

Figure 10:
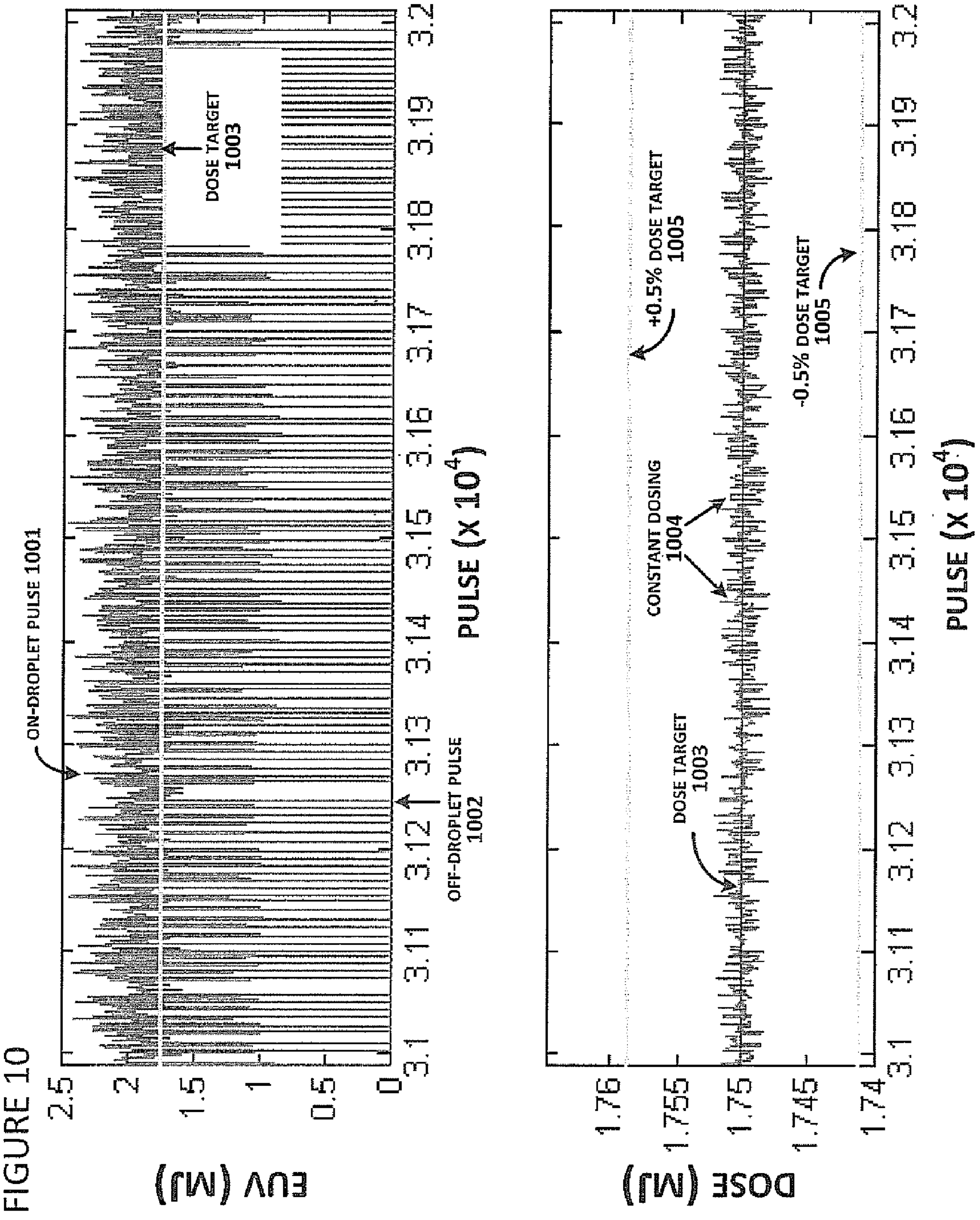
FIG. 10 shows EUV energy (upper panel) and energy dose (lower panel) generated during continuous burst firing using laser beam pulse timing to control EUV dose according to one embodiment.

FIG. 10 shows a sliding window of time-aligned EUV energy (upper panel) and energy dose (lower panel) generated during a continuous burst firing using laser beam pulse timing to control EUV dose according to one embodiment. As can be seen in the upper panel, although most pulses were fired on-droplet (e.g., on-droplet pulse 1001), a number of pulses were fired off-droplet (as indicated by the pulses generating 0 mJ EUV, e.g., off-droplet pulse 1002) to control error around the dose target 1003 (approximately 1.75 mJ in the figure). Consequently, as shown in the lower panel, constant dosing 1004 was achieved around 1.75 mJ and maintained well within ±0.5% of the dose target 1003 as indicated by reference number 1005.

Ideally, it is believed that if targeting conditions are correct and the drive laser has adequate performance, then embodiments of the laser beam pulse timing method described herein can maintain dose energy within ±0.5% of the dose target.

One of ordinary skill in the art will recognize that mistiming of laser pulses can be accomplished through a variety of mechanisms known in the art. For example, the drive laser can be fired so the laser pulse arrives at the primary focal spot early or late relative to the arrival of the droplet. Or, the timing of system shutters (e.g., electro-optic modulators or acousto-optic modulators) can be changed to let through low-level continuous wave light which is sufficient to seed amplifiers and reduce gain of the system. A preferred embodiment is to close the shutters early, and thereby advance the laser beam relative to the droplet.

As is known in the art, a MOPA+PP laser system pulses both a pre-pulse and a main pulse. One of skill in the art will recognize that both the main pulse and the pre-pulse are used to lase a droplet when the laser is pulsed on-droplet, and that neither the main pulse nor the pre-pulse are used to lase a droplet when the laser is pulsed off-droplet.

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above.

Further, it should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc., or a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method of regulating a dose of energy produced during continuous burst mode of an EUV light source comprising:

(a) beginning a burst having a predetermined energy dose target;

(b) timing by the laser controller a trigger to pulse a laser beam to irradiate a droplet during the burst;

(c) sensing EUV energy generated by the droplet;

(d) calculating by the laser controller a current dose error for the droplet based on the sensed EUV energy and the energy dose target;

(e) accumulating by the laser controller a burst error based on the current dose error and a running burst error calculated for one or more preceding droplet during the burst;

(f) repeating steps (b)-(e) for a next droplet when the burst is not finished and the accumulated burst error does not meet or exceed a threshold burst error;

(g) mistiming by the laser controller the trigger to pulse the laser beam to not irradiate the next droplet when the burst is not finished and the accumulated burst error meets or exceeds the threshold burst error; and (h) repeating steps (c)-(g) until the burst is finished.

2. The method of claim 1 wherein the current dose error equals the sensed EUV energy minus the energy dose target.

3. The method of claim 2 wherein the accumulated burst error equals running burst error+(gain*dose error).

4. The method of claim 3 wherein the gain is 1.

5. The method of claim 1 wherein the current dose error equals the energy dose target minus the sensed EUV energy.

6. The method of claim 5 wherein the accumulated burst error equals running burst error+(gain*dose error).

7. The method of claim 6 wherein the gain is −1.

8. A system for regulating a dose of energy produced during continuous burst firing of an EUV light source configured to generate an energy dose target comprising:

a drive laser configured to pulse a laser beam when a trigger is received;

a sensor configured to sense EUV energy generated by irradiation of a droplet; and a controller configured to:

(a) time the trigger to pulse a laser beam to irradiate a droplet during the burst;

(b) calculate a current dose error for the droplet based on the sensed EUV energy and the energy dose target;

(c) accumulate a burst error based on the current dose error and a running burst error calculated for one or more preceding droplet during the burst;

(d) repeat steps (a)-(c) for a next droplet when the burst is not finished and the accumulated burst error does not meet or exceed a threshold burst error;

(e) mistime the trigger to pulse the laser beam to not irradiate the next droplet when the burst is not finished and the accumulated burst error meets or exceeds a threshold burst error; and (f) repeat steps (b)-(e) until the burst is finished.

9. The system of claim 8 wherein the current dose error equals the sensed EUV energy minus the energy dose target.

10. The system of claim 9 wherein the accumulated burst error equals running burst error+(gain*dose error).

11. The system of claim 10 wherein the gain is equal to 1.

12. The system of claim 8 wherein the current dose error equals the energy dose target minus the sensed EUV energy.

13. The system of claim 12 wherein the accumulated burst error equals running burst error+(gain*dose error).

14. The system of claim 13 wherein the gain is −1.

* * * * *